Dec. 6, 1938.  G. M. HAFNER  2,138,966
RADIO COMPASS SYSTEM
Filed April 12, 1937
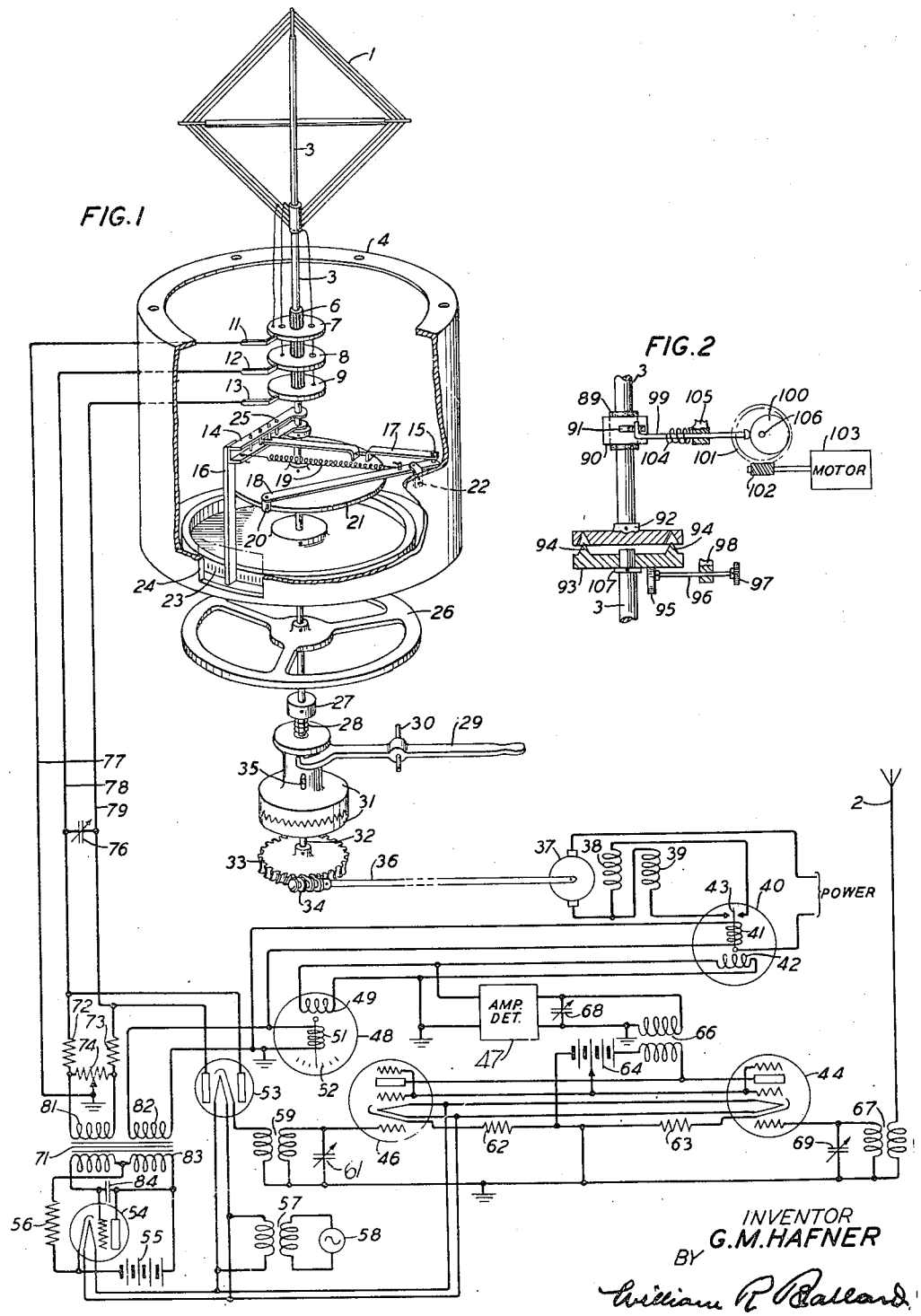
INVENTOR
G.M.HAFNER
BY
William R. Ballard
ATTORNEY Patented Dec. 6, 1938

2,138,966

UNITED STATES PATENT OFFICE 2,138,966

RADIO COMPASS SYSTEM

Gilbert Mark Hafner, Chicago, Ill., assignor to American Telephone and Telegraph Company, a corporation of New York Application April 12, 1937, Serial No. 136,431

6 Claims. (Cl. 250—11)

This invention relates to radio compass systems.

An object of this invention is to provide a radio compass system for mobile craft which will indicate automatically and continuously with respect to the heading of the craft the azimuth angle of a transmitting station whose electromagnetic wave is being received.

A further object of the invention is to provide a rugged and precise automatic radio compass system which may be readily used by personnel having no special training in the radio art.

Other objects and advantages of the invention will be apparent during the course of the following description.

In the accompanying drawing, Figure 1 shows in diagrammatic form the radio compass system of this invention; and Fig. 2 shows an arrangement for wagging the loop antenna to increase the accuracy of the system at weak signal strengths.

The system as shown in Fig. 1 comprises loop antenna 1 supported on vertical shaft 3, said shaft being arranged so that it may be rotated, contact rings 7, 8 and 9 to which are connected the mid-point and ends of the loop antenna and which are mounted on insulating collar 6 carried on shaft 3, brush springs 11, 12 and 13 through which rings 7, 8 and 9 respectively are connected to the electrical circuit, compensating wheel 21 and an associated system of levers 14, 17 and 18 carrying indicating arm 16, an angle indicating wheel 23 rigidly attached to shaft 3 and having a scale on its periphery, a portion of which may be viewed through window 24 of the stationary housing 4, handwheel 26 rigidly attached to shaft 3, a clutch comprising parts 27, 28, 29, 30, 31 and 35 and connecting shaft 3 with shaft 32, worm wheel 33 rigidly attached to shaft 32, associated worm 34 on shaft 36 arranged to be driven by motor 37 having field windings 38 and 39 the direction of winding 38 being the reverse of that of winding 39, the dynamometer type relay 40, the non-directional antenna 2, indicating meter 48 and the electrical circuit comprising vacuum tubes 44, 46, 53 and 54 and associated apparatus and wiring.

The operation of the system is as follows. A radio frequency wave, of frequency W, from a known radio beacon station is received on both the loop antenna 1 and the non-directional antenna 2. The midpoint and ends of the loop antenna 1 connect through contact rings 7, 8 and 9, springs 11, 12 and 13 and wires 77, 78 and 79 respectively to the plate circuits of the balanced rectifying vacuum tube 53. The loop antenna is tuned to the desired beacon station by condenser 76. Resistances 72, 73 and 74 form a "resistance pad" which adjusts the impedances of the loop antenna, the winding 81 of transformer 71 and the plate circuits of rectifying tube 53 to each other and permits grounding the mid-point of these circuits. A low frequency electromotive force of frequency $V$ is introduced into this circuit by winding 81 of transformer 71, the low frequency electromotive force being generated by the oscillation, in accordance with well-known principles, of the circuit comprising vacuum tube 54, condenser 84, resistance 56, battery 55 and the two halves of winding 83 of transformer 71 connected as shown on the drawing. Winding 82 of transformer 71 furnishes an electromotive force of this same low frequency directly to winding 51 of indicating meter 48. The plate cathode circuit of tube 53 is completed through one winding of transformer 59. Because of the balanced character of the rectifier circuit the carrier wave of frequency $W$ will not appear in the transformer 59 but the side-bands of frequencies $W+V$ and $W-V$ will, provided that $W$ is being received on the loop antenna. These sideband currents will be impressed upon the grid circuit of the amplifying vacuum tube 46. The vacuum tube 46 serves also as a blocking amplifier to prevent interference in the rectifying circuit by the signal W as received on non-directional antenna 2. The signal of frequency $W$ as received on the antenna 2 is impressed through transformer 67 on the grid of the amplifying vacuum tube 44 which like tube 46 serves as a blocking amplifier to keep the rectifying circuit sidebands from reaching antenna 2. The input circuits of tubes 44 and 46 are tuned to the desired frequencies by the condensers 69 and 61 respectively. The output circuits of these tubes are connected in parallel so that the side-bands produced in the rectifying circuit are combined with the signal W as received on antenna 2. Battery 64 furnishes the requisite potentials for these tubes. The combined output of these tubes is impressed through transformer 66 on the input of amplifier detector 47, this input being tuned by condenser 68. The output of the amplifier detector is impressed upon the winding 49 of meter 48, and winding 42 of relay 40. When the axis of null reception of the loop antenna is pointing at the selected beacon station no radio frequency signal W will be received on the loop, no side-bands will be produced in the rectifying circuit and the output of the amplifier detector 47 will contain no component of frequency V. In this case the meter 48 is adjusted so that the indicator is at the mid-point of its scale 52 and the reading on the scale of wheel 23 indicated by pointer 16 shows the azimuth angle of the beacon station with respect to the direction of the heading of the craft. Also relay 40 is adjusted so that in this case its armature is in mid-position and the power supply circuit to motor 37 is open. When the loop antenna is so positioned that the direction of the selected beacon station is on one side of the axis of null reception, a signal wave of frequency W, in phase with the same signal wave as received on antenna 2 will be received on the loop. If the direction of the selected beacon station is on the other side of the axis of null reception the signal W as received on the loop will be 180 degrees out of phase with the same signal as received on the antenna 2. When the signals W from the two antennae are in phase the reading of the meter 48 on scale 52 will be greater than mid-scale and when they are of opposite phase the reading will be less than mid-scale. The system is usually, for convenience, arranged so that rotating the loop in the direction opposite to that of the meter deflection will normally tend to bring the indicator back to its mid-scale position. When so arranged, if the motion of the needle is opposite to that of the loop it indicates that the wrong end of the axis of null receptivity is being pointed at the beacon station and the loop should be turned 180 degrees. As will appear from the description hereunder when the rotation of the loop is controlled by the motor circuit, a particular end of the axis of null receptivity will automatically be pointed at the beacon station since the direction in which the motor turns is controlled entirely by the phase relation between the beacon signals as received on the two antennae. The dynamometer type relay 40 actuated through its windings 41 and 42 is arranged so that it makes neither contact when there is no current of frequency V in winding 42. When there is current of frequency V in winding 42, this current actuates armature 43 in such a direction as to cause motor 37 to rotate the loop shaft and to swing a particular end of the null axis of the loop antenna toward the beacon station. For example, when the phases of the signals received on the two antennae are the same, the relay would, we will assume, move its armature 43 toward the left and energize the motor through field winding 39. When the null axis reaches the position in which it points toward the beacon station the component of frequency V as above explained no longer reaches winding 42 and the armature 43 of the relay 40 reassumes its mid-position, breaking the motor power supply circuit and leaving the null axis of the loop pointing toward said beacon station. Should the craft then turn so that wave W strikes the loop antenna on the other side of the null axis, the current V would again appear in winding 42 but would be of the opposite phase. This would cause the relay 40 to operate its armature 43 in the opposite direction closing the power supply circuit to the motor through the other field winding 38 whereupon the motor would turn the loop shaft in the opposite direction until the null axis again pointed toward the beacon station and relay 40 again opened the supply circuit. The reading on the scale of wheel 23 indicated by pointer 16 would, in each case when the pointing operation had been completed, show the azimuth angle of the beacon station with respect to the craft's heading. The purpose of compensating wheel 21 and its associated system of levers 14, 17 and 18 is to correct for distorting effects upon the fields of electromagnetic waves of surrounding metallic parts of the craft such as guy wires, metal plates, etc. One end of lever 18, carries roller 20. Lever 18 is supported at a fulcrum near its opposite end, as shown, by support 22 attached to stationary housing 4. Adjustable arm 17 is held in compression between pin 15 at the far end of lever 18 and one of the four like pins 25 on arm 14 by spring 19. Arm 14 turns loosely on shaft 3 at one end and carries pointer 16 on its opposite end. Roller 20 follows the periphery of compensating wheel 21 and the members 14 and 17 are adjusted to give the proper amount of compensating movement to indicator 16. The shape of the periphery of wheel 21 is determined by sighting and measuring the actual angles of a nearby beacon station for each 5 degree point of a circle after which the necessary changes in the periphery of wheel 21 are made so that the correct azimuth angles for each point are indicated by pointer 16 on the scale of wheel 23. The effects of surrounding objects upon the loop antenna are minimized and the balance of the loop is improved by enclosing it in a metallic shield. Should the automatic pointing circuit controlling motor 37 become disabled the motor can be disengaged by throwing lever 29 so as to raise the upper half of the clutch 31. The loop may then be rotated by handwheel 26 until the indicator of meter 48 returns to its mid-scale position in which case, as above explained, the null axis of the loop antenna will be pointed at the beacon station. Provided, as explained above, that the meter needle moved in the same direction as the handwheel in approaching its mid-position, the azimuth angle of the beacon station will then be shown by pointer 16 on the scale of wheel 23. Tuning condensers 61, 68, 69 and 76 are "ganged" together and the dial positions for each beacon station may be indicated on the face of the tuner so that the operator need only turn a single dial to tune to a particular beacon station. The system will then automatically and continuously show the azimuth angle of the selected beacon station as above described.

When the beacon signal is feeble it is well known that the loop antenna will have what is known as a "wide minimum". The effect of this is that there must be an appreciable angular displacement of the loop from its true "null" or normal position of zero receptivity before sufficient beacon signal energy is received to be of practical utility. In extreme cases this angular displacement may be from five to ten degrees which naturally greatly impairs the accuracy of the directional indication given.

To overcome this difficulty the arrangement of Fig. 2 provides means for mechanically wagging the loop antenna back and forth through an angle which may be adjusted to cover any wide minimum which the loop antenna may have. The system of Fig. 1 will then operate to point the loop until it wags about its true null position.

Partial compensation for this effect may, of course, be made by interpolation between the positions at which signals are received. Such interpolation, however, requires manipulation and calculation by the operator, it may be laborious and involve observational errors and is generally not satisfactory as it frequently may inconvenience the navigation of the craft.

The salient features and operation of the arrangement of Fig. 2 are as follows: The loop shaft 3 is cut at convenient point between the loop and the housing 4. The lower end of the upper portion of the shaft is then provided with hub plate 92 which is firmly pinned to the shaft. The upper end of the lower portion of shaft 3 is provided with hub plate 93. This shaft end is squared and the hole in hub plate 93 is made to have a sliding fit with the shaft and may move vertically, or longitudinally thereon. In its lowest position, hub plate 93 rests upon collar 107, the latter being pinned to the shaft. Hub plate 93 carries one or several conical projections 94 which correspond to similar conical depressions in hub plate 92. Shaft 96, supported in fixed bearing 98, carries knurled knob 97 at one end and eccentric cam 95 at the other. By turning knurled knob 97, therefore, hub plate 93 may be raised or lowered, that is, moved longitudinally, on shaft 3. In its uppermost position hub plate 93 fits tightly against hub plate 92, projections 94 of plate 93 fitting into and filling the corresponding conical depressions of plate 92. In this position, the upper portion of shaft 3 carrying plate 92 cannot turn unless the lower portion of shaft 3 carrying plate 93 also turns a like amount. However, as plate 93 is allowed to slide down on its portion of shaft 3, by turning eccentric 95, an increasing amount of play is introduced between the projections 94 on plate 93 and the corresponding depressions in plate 92. Therefore, the upper portion of the shaft may be "wagged" or turned back and forth through an angular displacement which increases as plate 93 is lowered. Means for wagging the upper portion of shaft 3 carrying the loop antenna comprise cylindrical collar 90 lined with a cylindrical washer 89 and assembled on the upper portion of shaft 3. The washer 89 may be of cork or other suitable material and is held against the shaft by collar 90 with sufficient pressure to provide a frictional drive which will turn the shaft 3 when free but will slip when contact is made between the depressions of plate 92 and the projections 94 of plate 93. Projecting from collar 90 is a small arm 91 in the free end of which is a slot. Rod 99 which may slide horizontally through fixed support 105 is bent at one end so as to engage in the slot in arm 91. Arm 99 is periodically moved toward the shaft by the turning of eccentric 100 and returns to the position shown in Fig. 2 under the pull of spring 104 as eccentric 100 returns to its position as shown in Fig. 2. Eccentric 100 is carried on shaft 106 which also carries worm wheel 101. Worm wheel 101 engages worm 102 on the shaft of a motor 103. Motor 103 obviously supplies the motion to actuate the wagging means, and the angle through which the loop antenna is wagged is adjusted to correspond to the wide minimum, if any, of the loop by adjusting eccentric 95. If the antenna is wagged through an angle exceeding the wide minimum of the loop, motor 37 after having pointed the antenna at the beacon station will respond at both extremes of the wagging motion, reversing its direction for successive responses. If the antenna is wagged through an angle equal to the wide minimum, motor 37 will point the antenna at the beacon station and will not respond further until the heading of the craft is changed or the "minimum" becomes more narrow. For precise readings, therefore, eccentric 95 should be adjusted so that motor 37 just fails to respond at both extremes of the wagging motion. The frequency of the wagging motion should, of course, be such that response of the motor 37 with respect to the extremes of the wagging motion may be readily observed. When using the handwheel, responses of the meter may obviously be observed, in place of those of motor 37, in adjusting the wagging motion to the wide minimum.

Compass systems in accordance with this invention have consistently given bearing angles which have been accurate to within one-half a degree at a distance of 200 miles and bearing angles which have been accurate to within one degree up to approximately 400 miles with good conditions for radio reception from Class A or Class B United States Department of Lighthouse Radio Beacons.

Other applications and modifications within the spirit and scope of the invention will occur to persons skilled in the art and no effort has been made to be exhaustive.

What is claimed is:

1. A radio compass system including a rotatable directional antenna, automatic means for periodically wagging said antenna through a definite angular displacement, said means operating independently of the reception of energy by said antenna, and a second automatic means for rotating said antenna in response to beacon signals received by said system to point the axis of null receptivity of said antenna toward the beacon station, said automatic wagging means including a frictional drive and a shaft coupling arranged to confine the oscillatory wagging motion to the directional antenna whereby the sensitivity and precision of said radio compass system is increased for feeble beacon signals.

2. A radio compass system for mobile craft comprising a directional antenna and a non-directional antenna, said directional antenna having a single axis of null receptivity and a phase difference of 180 degrees between signals received from one side of said null axis with respect to signals received from the other side of said null axis, said directional antenna being mounted on a rotatable shaft, automatic means controlled by the phase relation of a radio beacon signal as received on said directional antenna to the same signal as received on said non-directional antenna, for rotating said shaft in one direction for one phase relation and in the opposite direction for the opposite phase relation until a particular end of said axis of null receptivity points in the direction of the beacon station, and means controlled by the rotation of said shaft for showing the azimuth angle of said beacon station with respect to the heading of the craft, and cooperatively associated therewith automatic means for periodically wagging the rotatable directional antenna through an angular displacement sufficient to bridge the arc of null reception of said antenna, said means operating independently of signal reception and including a frictional drive and a shaft coupling arranged to confine the oscillatory wagging motion to the directional antenna without interference with the operation of the other portions of said system whereby the precision and sensitivity of said system is increased for feeble beacon signals.

3. A radio compress system comprising a rotatable directional antenna having a single null axis of receptivity, a non-directional antenna, means for comparing the phases of the signal from a transmitting station as impressed upon each of said antennae, and means controlled by said first stated means for constantly pointing a particular end of the null axis of said directional antenna in the direction of said transmitting station, and associated therewith automatic means operating independently of signal reception for periodically wagging the rotatable directional antenna through an angular displacement, said displacement being adjustable to bridge the arc of null reception of said antenna, said wagging means including a frictional drive and a shaft coupling arranged to confine the wagging motion to the directional antenna without interference with the operation of other parts of the system so that the precision and sensitivity of said system is increased for feeble beacon signals.

4. A radio compass system including a rotatable directional antenna means responsive to beacon signals for pointing the axis of null receptivity of said directional antenna toward the beacon emitting said signals, means for directly indicating the azimuth angle at which said axis of null receptivity is pointed and automatic means for wagging the directional antenna through an angular displacement, said wagging means including means arranged to confine the wagging motion to the directional antenna whereby the azimuth angle indicating means is prevented from following the oscillatory motion of the said antenna.

5. In a radio compass system, a directional antenna mounted on a first rotatable shaft, a coupling joining said shaft to a second rotatable shaft, said coupling permitting free movement over a particular angular displacement of said first shaft with respect to said second shaft, said second shaft being connected to other apparatus having appreciable inertia, means for imparting an oscillatory angular movement exceeding said particular angular displacement to said first shaft, said means including a drive operating through friction upon said first shaft, the strength of said frictional drive being sufficient to rotate said first shaft and said directional antenna through the particular free angular displacement permitted by said coupling and insufficient to overcome the inertia of the apparatus connected to said second shaft whereby said directional antenna may be wagged through the particular angular displacement without imparting oscillatory motion to said second shaft.

6. In a direction finding system including a rotatable loop antenna, motor driven means for wagging the loop antenna through an angular displacement and means comprising a plurality of clutch plates at least one of which is longitudinally movable, for adjusting the extent of the wagging motion, said means being adjusted so that the width of the arc of null receptivity of said antenna as ascertained for the particular signal being received and the extent of the wagging motion are substantially equal.

GILBERT M. HAFNER.